United States Patent [19]

Paquin

[11] Patent Number: 5,113,735
[45] Date of Patent: May 19, 1992

[54] SLITTING APPARATUS

[75] Inventor: Ronald J. Paquin, Elginburg, Canada

[73] Assignee: Alcan International Limited, Montreal, Canada

[21] Appl. No.: 690,003

[22] Filed: Apr. 23, 1991

[51] Int. Cl.⁵ .......................... B23D 19/06; B26D 1/14
[52] U.S. Cl. ...................... 83/508.3; 83/664; 83/700
[58] Field of Search ............... 83/425.4, 504, 508.3, 83/664, 665, 499, 698, 699, 700; 29/124, 125, 130

[56] References Cited

U.S. PATENT DOCUMENTS

| | | | |
|---|---|---|---|
| 3,411,392 | 11/1968 | Spangler | 83/664 |
| 3,422,714 | 1/1969 | Van Gompel et al | 83/665 X |
| 3,782,234 | 1/1974 | Rodach | 83/698 X |
| 4,010,528 | 3/1977 | Bohmer | 29/125 |
| 4,162,643 | 7/1979 | Coburn | 83/504 X |
| 4,275,631 | 6/1981 | Wingen | 83/501 |
| 4,541,163 | 9/1985 | Eiting | 29/426.5 |
| 4,547,997 | 10/1985 | Kimmelaar et al. | 83/666 X |
| 4,641,559 | 2/1987 | Castiglioni | 83/333 |
| 4,729,193 | 3/1988 | Gant et al. | 83/666 X |
| 4,752,145 | 6/1988 | Schelshorn et al. | 29/124 X |
| 4,757,732 | 7/1988 | Arima | 83/425.2 |
| 4,805,506 | 2/1989 | Gosnell | 83/664 X |

FOREIGN PATENT DOCUMENTS 1574421 9/1980 United Kingdom .

Primary Examiner—Frank T. Yost
Assistant Examiner—Eugenia A. Jones
Attorney, Agent, or Firm—Cooper & Dunham

[57] ABSTRACT

An apparatus for slitting sheet material to a desired width includes laterally spaced circular slitter knives each fixed to a hub mounted on a rotatable shaft, each said hub being an hydraulic hub adapted to be expanded to permit axial movement on the shaft by injecting hydraulic fluid into an annular groove in the inside diameter of the hub. The novel feature comprises spacer rollers between the slitter knives to support the sheet material, these spacer rollers being arranged in cooperating pairs with each spacer roller comprising an annular hub portion with a plurality of equally spaced projections extending in an axial direction from at least one annular face of said hub. The projections are adapted to slidably mate with like projections of a cooperating spacer roller and each spacer roller hub is adapted to be expanded to permit axial movement thereof on the shaft by injecting hydraulic fluid into an annular groove in the inside diameter of the spacer roller knife hub.

9 Claims, 3 Drawing Sheets

SLITTING APPARATUS

BACKGROUND OF THE INVENTION

This invention relates to slitting devices and, more particularly, to slitters for slitting continuous sheet material into strips of precise width.

Slitting devices of known type include spaced and parallel rotatable shafts or arbors having cooperating cutting knives thereon. Sheet material, e.g. metal sheet, is fed between the cooperating cutting knives which slit the sheet material into continuous strips of precise width.

In order to adjust the width of the strip or strips being cut, it is desirable to be able to move the slitter knives along the rotatable shafts. For this purpose, hydraulically expandable hubs have been developed, such as those described in Eiting, U.S. Pat. No. 4,541,163, issued Sept. 17, 1985. Such hubs operate on the principle of expanding the diameter of the hub by application of hydraulic pressure to the interior of the hub so as to enable the expanded hub to slide over the surface of the shaft. The hydraulic pressure is applied to an annular chamber defined between a groove in the interior of the hub and the outside diameter of the shaft over which the shaft is to slide. Upon removal of the pressure, the hub returns to the diameter of the shaft and is thereby frictionally secured to the shaft.

To ensure accuracy in the width of the strip being slit, the sheet material must be maintained flat during the actual slitting. This is typically accomplished by employing polyurethane support rings surrounding metal spacers that fit snugly between the slitter knives on a slitting head. A problem that has been encountered is how to easily install these spacers and rings.

This particular problem is accentuated for machines on which the slitter knives are mounted on hydraulically expandable hubs. Thus, when the hydraulically expandable hubs are used, it is a very easy matter to adjust the lateral spacing of the slitter knives themselves. The problem is how to position the fill-in metal spacers and polyurethane rings between the slitter knives with equal ease. Typically, spacers are now used which have been cut in half and which can be reassembled on an arbor and fixed in place with bolts. The polyurethane rings are then slid over the spacers. This is not only time consuming, but such assemblies are prone to mechanical damage when the bolts become cross-threaded and require regular reconditioning.

Another system for varying the support length when the spacing of slitter knives is changed is described in Arima, U.S. Pat. No. 4,757,732, issued July 19, 1988. This system used a series of spacer rollers of different lengths mounted on a rotary support frame. For instance four rollers may be mounted on a rotatable support with separate bearing mountings, etc. This arrangement is both cumbersome and expensive.

It is an object of the present invention to provide a support arrangement for sheet material between the slitter knives that can easily be adjusted when the lateral spacing of the slitter knives is adjusted.

SUMMARY OF THE INVENTION

The present invention relates to a novel design of support and spacer rollers for mounting on a rotatable shaft carrying laterally spaced slitter knives, to provide support for sheet material between the knives. The novel spacer rollers are arranged in cooperating pairs with each spacer roller comprising an annular hub portion with a plurality of equally spaced projections extending in an axial direction from at least one annular face of the hub, these projections being adapted to slidably mate with like projections of a cooperating spacer roller. Each spacer roller hub is adapted to be expanded to permit axial movement on the shaft by injecting hydraulic fluid into an annular groove in the inside diameter of the spacer roller hub. These spacer rollers take the place of the traditional spacers and rings.

With the arrangement of this invention, it will be seen that the spacer roller hubs can easily be adjusted along the rotatable shaft in the same manner as the slitter knife hubs and simultaneously, the spacer roller telescopically adjusts by the slidable mating between the projections or fingers. Thus, these projections or fingers still provide sufficient support to the sheet material passing over them to assure uniform cutting by the circular slitter knives.

The spacer rollers are preferably made of a composite material. Thus, each roller preferably comprises a metal sleeve portion adjacent the shaft in which an annular groove is formed for the hydraulic expansion system. A relatively soft resilient material is then bonded to the metal sleeve to fill the remaining radial distance required for support of the sheet material. The resilient material is typically a plastic, e.g. a plastic material having a Shore A Hardness of between 60 and 85, so as to provide sufficient resiliency under compression. Polyurethanes are preferred, but other materials such as nitrile rubber may be used. The resilient material should have a thickness of at least $\frac{3}{8}$ inch, with greater thicknesses being preferred.

Depending upon the distance between slitter knives on a shaft, only a pair of spacer rollers may be required or several may be used. When only a pair is required, each spacer roller of that pair has the equally spaced roller projections extending in an axial direction from only one annular face of the hub. If three or more spacer rollers are used, the end spacer rollers have projections extending in one axial direction only, while the central spacer rollers have projections extending in an axial direction from both annular faces of the hub.

BRIEF DESCRIPTION OF THE DRAWINGS

The structural and functional characteristics and the advantages of the device according to the present invention will be better understood from the disclosure of preferred forms thereof, referred to the related schematic drawings, wherein.

DETAILED DESCRIPTION OF THE INVENTION

Figure 1:
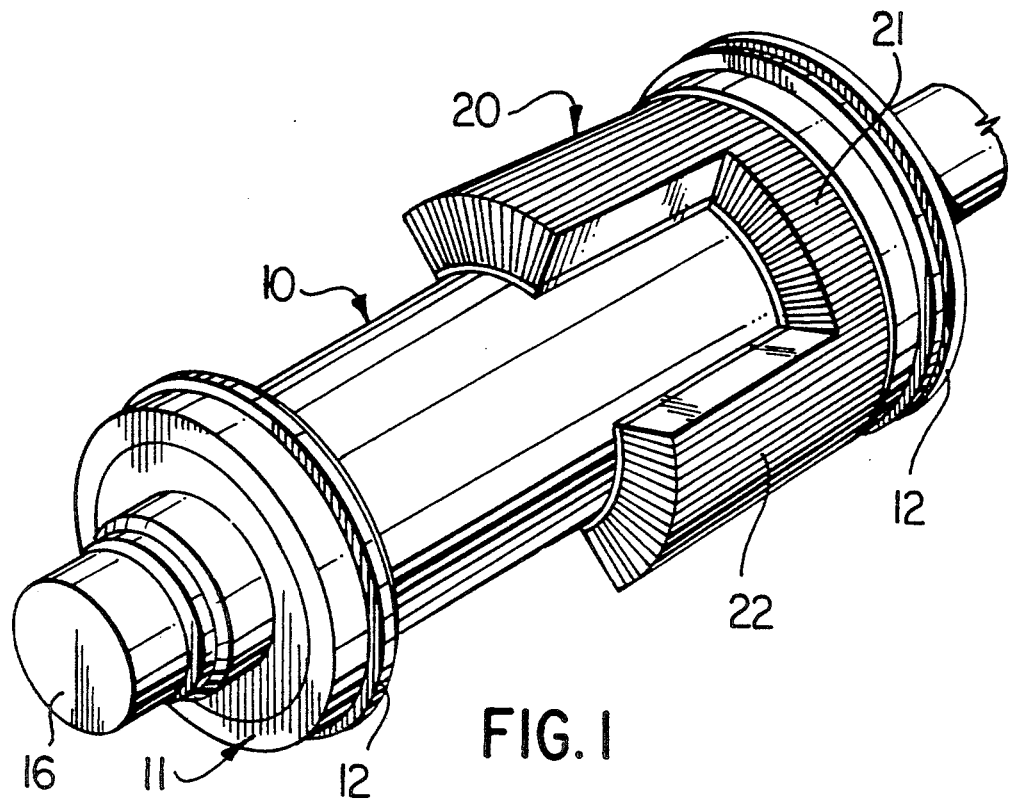
FIG. 1 is a perspective view of a slitter device according to the invention.
Figure 2:
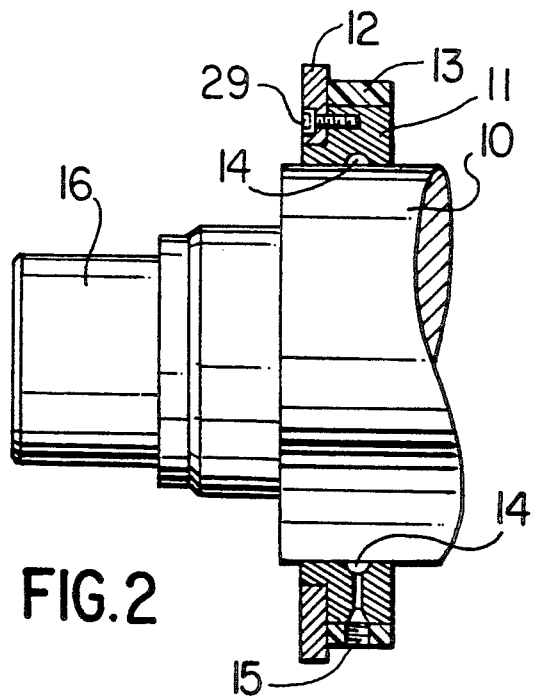
FIG. 2 is a partial cross-sectional view of a slitter knife and hydraulically expandable hub mounted on an arbor.
Figure 3:
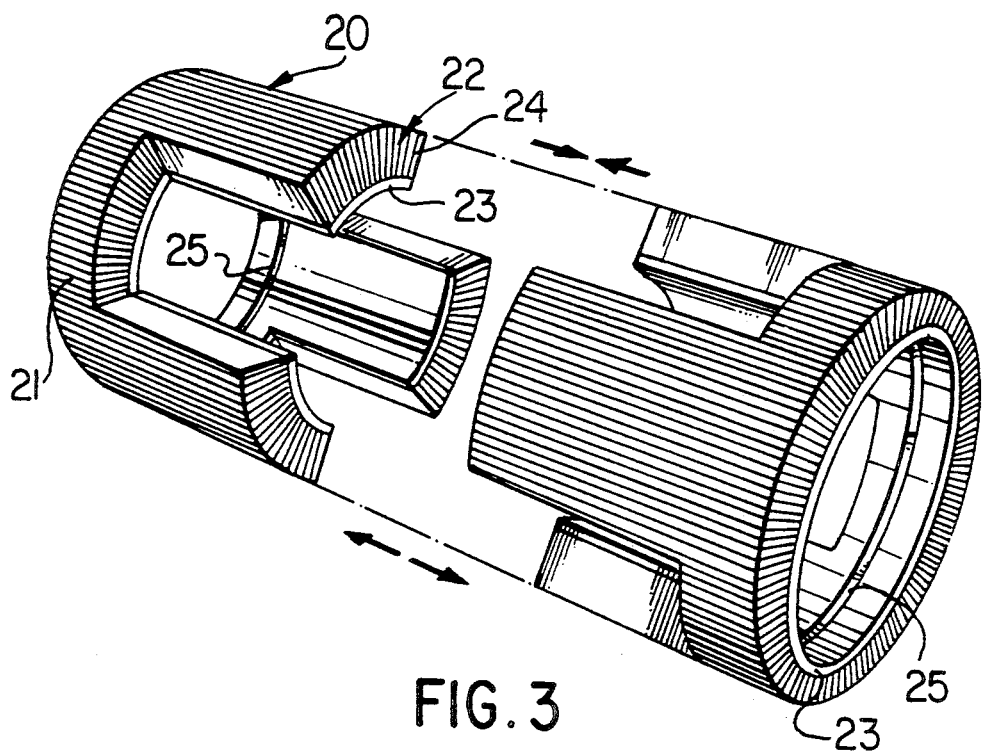
FIG. 3 is an exploded perspective view of a pair of spacer rollers according to the invention.

Referring now to FIGS. 1 to 3 of the drawings, there is shown a shaft or arbor 10 upon which is mounted a conventional hydraulically expanded hub (so-called hydraulic hub) 11. This hub 11 has a slitter knife 12 mounted thereon and secured thereto by bolts or screws 29. A polyurethane ring 13 is positioned adjacent the knife 12 to provide partial support for the sheet material being slit.

The inside of the hub 11 is provided with an annular groove 14 which is connected via port 15 on the periphery of the hub. This port 15 is adapted to be attached to a source of high pressure fluid, e.g. in the order of 4,000 psi, when the hub is mounted on the shaft 10 So long as this pressure is maintained to the port 15, the hub 11 may be moved along the shaft 10. When this pressure is relieved, the hub reduces in diameter and is thereby fixedly secured to the shaft.

Trunions or bearings 16 extend outwardly from opposite ends of the shaft 10.

FIG. 1 of the drawings shows one of the spacer rollers of the present invention mounted on shaft 10. This spacer roller 20 includes a hub portion 21 and projections or fingers 22 extending in an axial direction from one annular face of hub 21. As illustrated, there are three equally spaced projections or fingers 22 in this embodiment.

Figure 5:
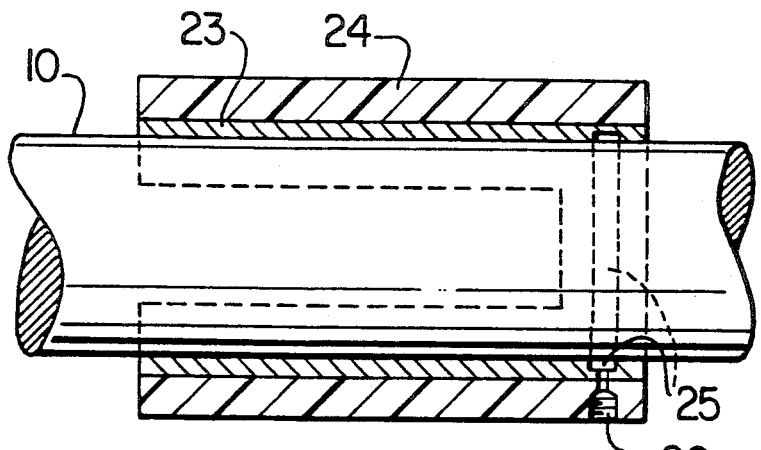
FIG. 5 is a sectional view of a mounted spacer roller according to the invention.

The spacer rollers 20 are preferably made in composite form with a metal, e.g. steel, sleeve portion 23 surrounding the shaft 10 and an annular plastic portion 24 bonded to sleeve 23 and extending radially outwardly sufficiently far to provide the necessary support for the sheet material. The plastic material 24 is preferably formed of polyurethane. The hub portion of the spacer roller 20 includes an annular groove 25 and it is adapted to receive hydraulic fluid under pressure via portion 26 shown in FIG. 5 in the same manner as the slitter knife hub 11.

Figure 4:
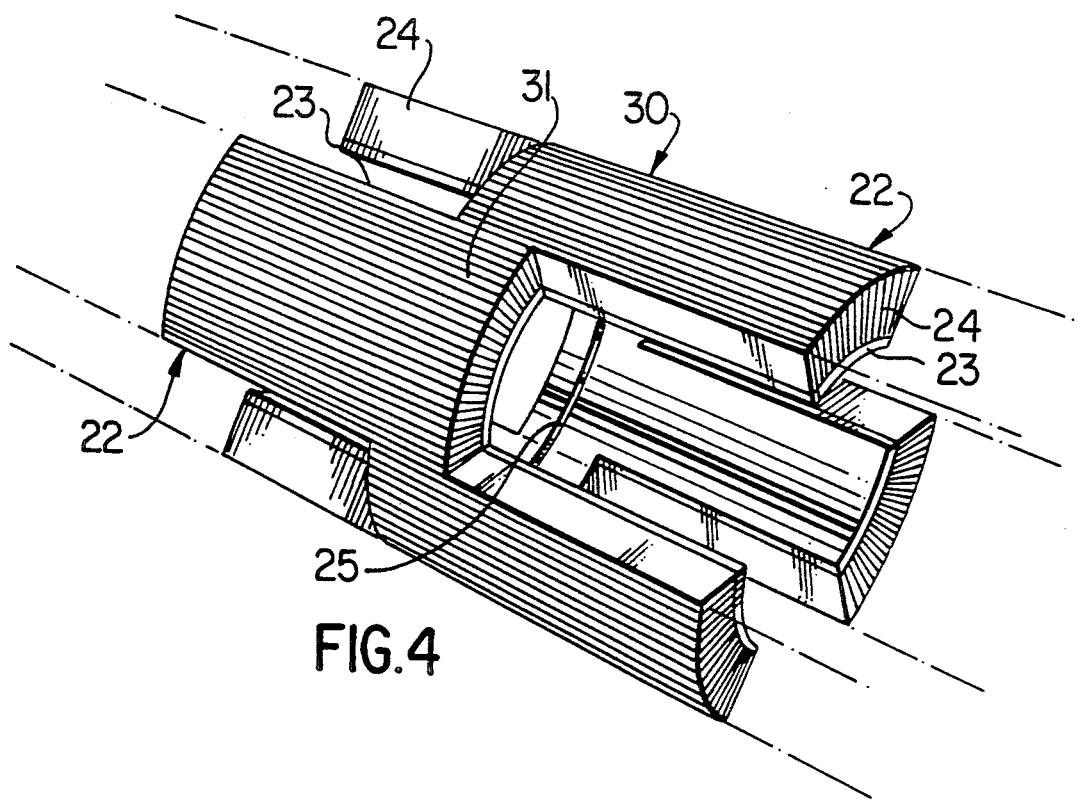
FIG. 4 is a perspective view of a central spacer roller with projections in both directions from a hub.

FIG. 3 shows an exploded view of a pair of spacer rollers 20 and shows the manner in which the projections or fingers 22 slidably engage. A central spacer roller is shown in FIG. 4 and this roller 30 includes fingers or projections 22 which extend in both directions axially from a central hub member 31. This central hub member 31 includes an annular groove 25 in the same manner as hub 21 of spacer roller 20. A pair of end spacer rollers 20 and a central spacer roller 30 are shown in assembled position in FIG. 6.

Figures 7, 8:
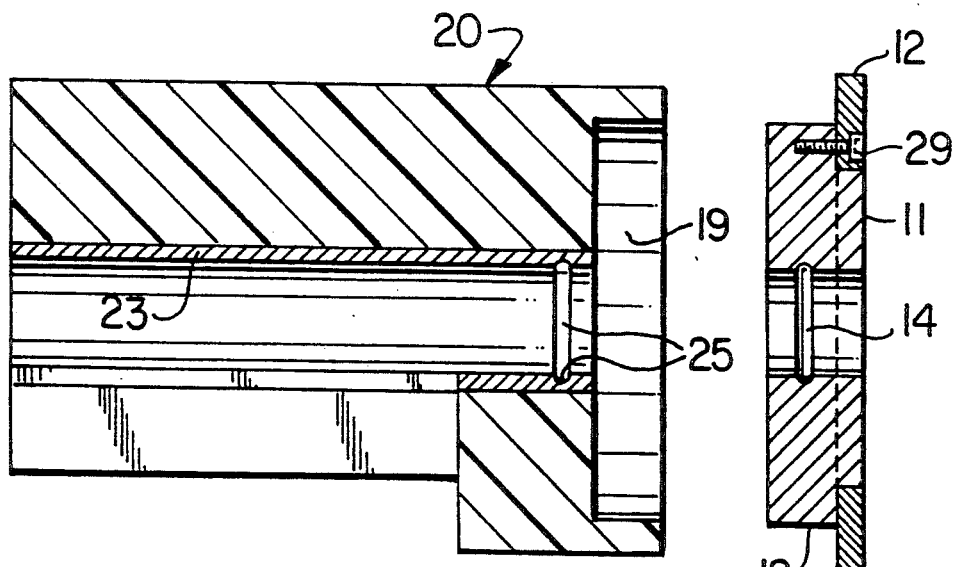
FIG. 7 is a sectional view through a spacers roller.
FIG. 8 is a sectional view through a slitter knife hub.

The spacer roller shown in FIGS. 7 and 8 is basically the same as that of FIGS. 1 and 3, but further includes a cylindrical recess 19 in one end thereof to fix over an axially projecting collar 18 on the slitter knife hub 11.

Figure 6:
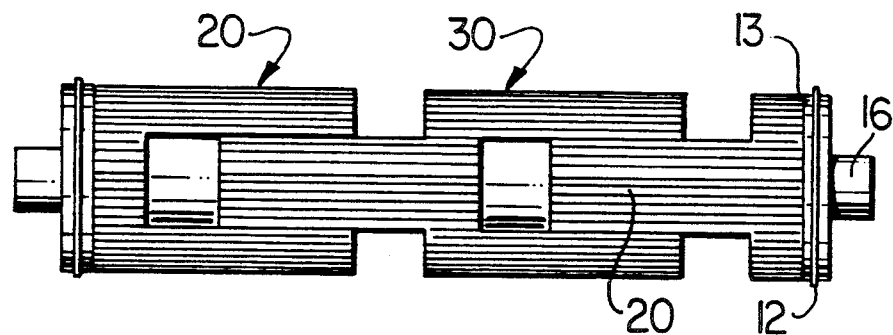
FIG. 6 is a plan view of a slitting device according to the invention with three interconnecting and telescoping spacer rollers.

With the apparatus of the present invention assembled for instance as shown in FIG. 6, when it is desired to adjust the lateral spacing between the slitter knives 12, it is simply a matter of connecting flexible hydraulic lines to connector ports 15 of the slitter knife hubs 11 and connector portions 26 of the spacer roller hubs 21 and 31 and applying hydraulic pressure. With the hydraulic pressure applied, the slitter knives can be moved to new lateral positions. The spacer rollers can be moved simultaneously such that the end hub portions remain adjacent the slitter knife hubs 11 and the fingers or projections move longitudinally with respect to each other while still providing support for the sheet material.

When the slitter knives and spacer rolls have been moved to their desired locations on the shaft, the hydraulic pressurizations are removed resulting in a fixed interference fit on the shaft by both the slitter knife hubs and the spacer roller hubs. It will be seen from FIG. 6 that when three or more equally spaced projections are used, the gaps that are formed in the surface of the telescoping rollers when the total length is increased do not prevent full support by the assembled rollers of sheet material being slit.

While the above describes what are at present considered to be the preferred embodiments of this invention, it will be obvious to those skilled in the art that various changes and modifications may be made therein without departing from the spirit of the invention.

I claim:

1. In an apparatus for slitting sheet metal to a desired width which includes laterally spaced circular slitter knives each fixed to a slitter knife hub mounted on a rotatable shaft, each said slitter knife hub being an hydraulic hub adapted to be expanded to permit axial movement on the shaft by injecting hydraulic fluid into an annular groove in the inside diameter of the slitter knife hub, the improvement which comprises spacer rollers between said slitter knives to support the sheet metal, said spacer rollers being arranged in cooperating telescopic pairs with each said spacer roller comprising an annular hub portion mounted on said rotatable shaft with a plurality of equally spaced projections extending longitudinally in an axial direction from at least one annular face of said slitter knife hub, said projections having a radial thickness substantially equal to the radial thickness of the spacer roller hub portion such that each said projection is directly supported by said rotatable shaft and slidably mating with like projections of a said cooperating spacer roller such that at least part of the longitudinally extending mating projections of each cooperating telescopic pair of spacer rollers form therebetween in all operational positions a continuous cylindrical support portion for said sheet metal and each said spacer roller hub portion being adapted to be expanded to permit axial movement thereof on the shaft by injecting hydraulic fluid into an annular groove in the inside diameter of said spacer roller hug portion.

2. An apparatus according to claim 1 wherein said plurality of equally spaced roller projections extend in an axial direction from only one annular face of said spacer roller hub portion.

3. An apparatus according to claim 1 wherein said plurality of equally spaced roller projections extend in an axial direction from both annular faces of said spacer roller hub portion.

4. An apparatus according to claim 1 wherein the spacer roller annular hub portion has three equally spaced said projections extending in said axial direction from at least one annular face thereof.

5. An apparatus according to claim 1 wherein each spacer roller comprises a metal sleeve portion adjacent said shaft with a resilient plastic material bonded to said sleeve portion and filling the remaining axial distance required to support the sheet metal.

6. An apparatus according to claim 5 wherein the plastic material is polyurethane.

7. An apparatus according to claim 1 which includes two said spacer rollers each having an end face adjacent a said hub portion thereof which abuts a said slitter knife hub.

8. An apparatus according to claim 7 wherein said spacer roller end face has a cylindrical recess adapted to receive a cylindrical, axial projection on a facing end of said slitter knife hub.

9. An apparatus according to claim 7 wherein each slitter knife hub includes a resilient ring member mounted on the slitter knife hub between the slitter knife and an adjacent spacer roller end.

* * * * *